(12) United States Patent
Park et al.

(10) Patent No.: US 8,197,112 B2
(45) Date of Patent: Jun. 12, 2012

(54) BACKLIGHT ASSEMBLY HAVING COLOR LEVEL SENSOR

(75) Inventors: Sang-hoon Park, Gyeonggi-do (KR); Young-joo Nam, Daegu (KR); Dong-gyun Ra, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 496 days.

(21) Appl. No.: 11/985,247

(22) Filed: Nov. 13, 2007

(65) Prior Publication Data

US 2008/0170173 A1 Jul. 17, 2008

(30) Foreign Application Priority Data

Jan. 11, 2007 (KR) .................. 10-2007-0003479

(51) Int. Cl.
*F21V 7/04* (2006.01)
*G09F 13/08* (2006.01)
*G09F 13/18* (2006.01)

(52) U.S. Cl. ... 362/615; 362/628; 362/630; 362/249.03; 362/97.3

(58) Field of Classification Search .................. 362/612, 362/615, 630, 631, 559, 561, 231, 249.03, 362/97.3, 623, 628; 349/61; 315/151; 257/432
See application file for complete search history.

(56) References Cited

U.S. PATENT DOCUMENTS

| | | | | |
|---|---|---|---|---|
| 3,040,168 A | * | 6/1962 | Stearns | 362/27 |
| 4,277,817 A | * | 7/1981 | Hehr | 362/628 |
| 4,909,604 A | * | 3/1990 | Kobayashi et al. | 349/64 |
| 5,291,054 A | * | 3/1994 | Tanaka et al. | 257/433 |
| 5,302,778 A | * | 4/1994 | Maurinus | 174/521 |
| 5,925,898 A | * | 7/1999 | Spath | 257/98 |
| 5,961,197 A | * | 10/1999 | Watai et al. | 362/628 |
| 5,993,020 A | * | 11/1999 | Koike | 362/628 |
| 6,855,886 B2 | * | 2/2005 | Kawamura et al. | 174/357 |
| 6,964,500 B2 | * | 11/2005 | Sakai | 362/276 |
| 7,514,662 B2 | * | 4/2009 | Kawakami | 250/205 |
| 8,033,709 B2 | * | 10/2011 | Kao et al. | 362/621 |
| 2004/0085750 A1 | * | 5/2004 | Okuwaki et al. | 362/31 |
| 2004/0114342 A1 | * | 6/2004 | Lin et al. | 362/31 |
| 2004/0119908 A1 | * | 6/2004 | Sakai | 349/65 |
| 2006/0017127 A1 | * | 1/2006 | Vigier-Blanc | 257/432 |
| 2007/0075217 A1 | * | 4/2007 | Kuo et al. | 250/205 |
| 2007/0147083 A1 | * | 6/2007 | Hwang | 362/613 |
| 2008/0088769 A1 | * | 4/2008 | Kim et al. | 349/61 |
| 2009/0066634 A1 | * | 3/2009 | Isobe et al. | 345/102 |

FOREIGN PATENT DOCUMENTS

| | | | | |
|---|---|---|---|---|
| JP | 2004021147 A | * | 1/2004 | |
| JP | 2007115716 A | * | 5/2007 | |

* cited by examiner

*Primary Examiner* — Ismael Negron
(74) *Attorney, Agent, or Firm* — Innovation Counsel LLP

(57) ABSTRACT

A backlight assembly includes: a light guide plate having a light entering surface, a light facing surface that is substantially parallel to the light entering surface, a light emitting surface connecting first edges of the light entering surface and the light facing surface, and a bottom surface connecting second edges of the light entering surface and the light facing surface. A light source unit provides light to the light entering surface. At least one color sensor is disposed to receive light from the light guide plate, and at least one light amplifying member is disposed between the light guide plate and the color sensor to collect and concentrate the light from the light guide plate on the color sensor.

18 Claims, 9 Drawing Sheets
(2 of 9 Drawing Sheet(s) Filed in Color)

FIG. 1

LUMINOUS INTENSITY 52 $^2$flux/mm

LUMINOUS INTENSITY $2.2^2$ flux/mm

BACKLIGHT ASSEMBLY HAVING COLOR LEVEL SENSOR

CROSS-REFERENCE TO RELATED APPLICATIONS

This application claims the benefit of Korean Patent Application No. 10-2007-0003479 filed on Jan. 11, 2007 in the Korean Intellectual Property Office, which is hereby incorporated by reference for all purposes.

BACKGROUND OF THE INVENTION

1. Field of the Invention

The present invention relates to a backlight assembly and a display device having the same, and more particularly to a backlight assembly having a slim outer appearance and a display device having the same.

2. Description of the Related Art

There are several kinds of display devices that are in use today. Among them, display devices equipped with a liquid crystal display (LCD) panel of enhanced performance has become one of the most predominant display devices, in part due to the rapidly developing semiconductor technology.

A display device equipped with an LCD panel has advantageous characteristics such as small size, light weight and low power consumption, and has attracted attention as a potential replacement for the cathode ray tube (CRT) as the mainstream display device. A display device equipped with the LCD panel is installed in most information processing devices that employ a screen, for example in a small product such as a mobile phone, a personal digital assistant (PDA) and a portable multimedia player (PMP), and in mid to large products such as a notebook computer, a monitor and a television.

Since the LCD panel is a not a self-emitting device, the LCD device usually uses a backlight assembly for supplying light to the LCD panel. The backlight assembly comprises a light source unit and other components such as a light guide plate, an optical sheet, a reflection member, an holding member, supporting member, an inverter circuit board, etc.

Since the backlight assembly is usually incorporated into the display device, the display device becomes thicker as the backlight assembly becomes thicker. However, a backlight assembly that is thin and capable of providing enhanced brightness, uniformity, and reliability is desired to meet consumer demands.

As the backlight assembly performance is enhanced and its importance in the display device is increased, the backlight assembly needs more components. A side effect of the increasingly important role played by the backlight assembly is that its thickness tends to increase as well.

This increase in display device thickness is undesirable, especially if the display device used in a product like notebook computer or monitor where compactness is an important characteristic. Accordingly, flat and thin backlight assembly is desired.

SUMMARY OF THE INVENTION

Accordingly, it is an aspect of the present invention to provide a backlight assembly having a slim structure solving the aforementioned problem.

Also, the present invention provides a display device comprising a backlight assembly having a slim structure.

In one aspect, the present invention is a backlight assembly that includes a light guide plate having a light entering surface, a light facing surface that is substantially parallel to the light entering surface, a light emitting surface connecting first edges of the light entering surface and the light facing surface, and a bottom surface that connecting second edges of the light entering surface and the light facing surface; a light source unit providing light to the light entering surface of the light guide plate; at least one color sensor disposed to receive light from the light guide plate; and at least one light amplifying member disposed between the light guide plate and the color sensor to collect and concentrate the light from the light guide plate on the color sensor.

In another aspect, the present invention is a display device that includes a panel assembly that displays an image; a light guide plate that includes a light entering surface, a light facing surface that is substantially parallel to the light entering part, a light emitting surface that faces the panel assembly and connects first edges of the light entering surface and the light facing surface, and a bottom surface that connects second edges of the light entering surface and the light facing surface; a light source unit providing light to the light entering surface of the light guide plate; at least one color sensor disposed to receive light from the light guide plate; and at least one light amplifying member disposed between the light guide plate and the color sensor to collect and concentrate the light from the light guide plate on the color sensor.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee. These and/or other aspects of the present general inventive concept will become apparent and more readily appreciated from the following description of the embodiments taken in conjunction with the accompanying drawings, of which:

FIG. 1 is a perspective view of a disassembled backlight assembly according to a first exemplary embodiment of the present invention.

DETAILED DESCRIPTION OF THE EMBODIMENTS

Figure 2:
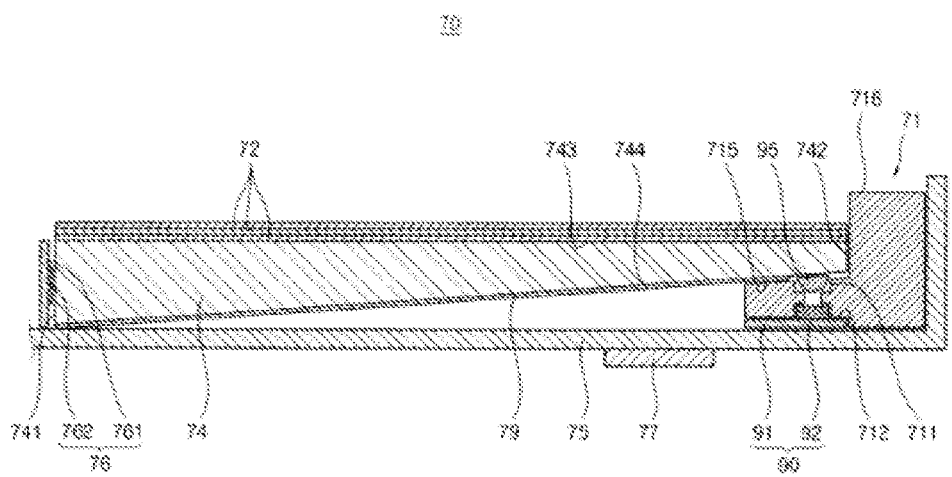
FIG. 2 is a partial cross sectional view taken along the line II-II of FIG. 1.

Reference will now be made in detail to the embodiments of the present invention, examples of which are illustrated in the accompanying drawings. The examples will be explained in detail so that those skilled in the art can make and use the present invention. Same elements are given the same reference numerals in different embodiments, and the elements that are repeated in different embodiments will be typically described in the first embodiment and omitted in subsequent embodiments in the interest of avoiding redundancy.

Figure 1:
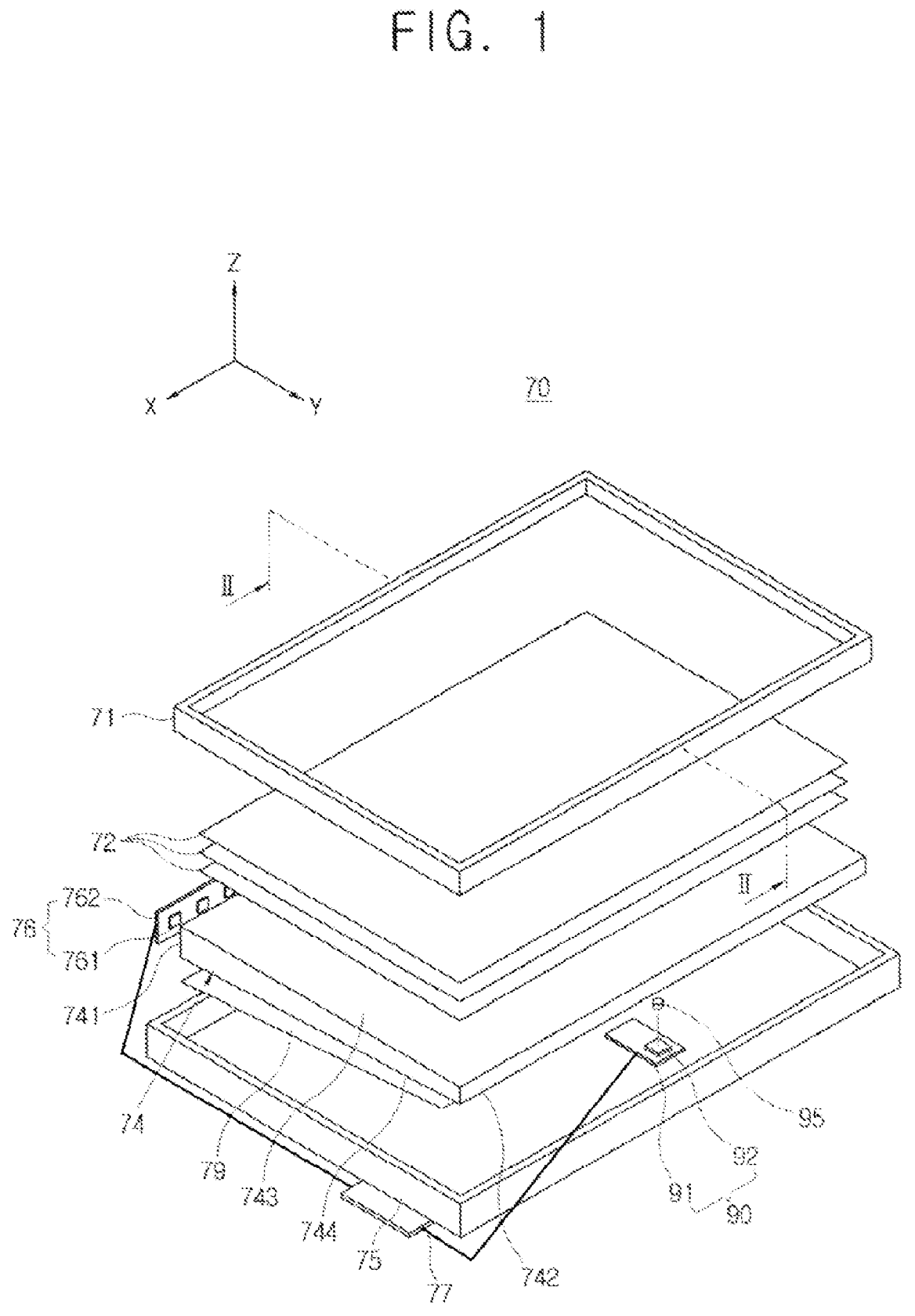

FIG. 1 is a backlight assembly 70 according to a first exemplary embodiment of the present invention.

As shown in FIG. 1, the backlight assembly 70 includes light guide plate 74, a light source unit 76, a color sensor 90, and a light amplifying member 95. The backlight assembly 70 further includes an inverter circuit board 77, an optical sheet 72, a reflecting member 79, a supporting member 71 and a holding member 75.

The light guide plate 74 includes a light entering surface 741, a light facing surface 742 facing the light entering surface 741, a light emitting surface 743 connecting the first edges of the light entering surface 741 and the light facing surface 742, and a bottom surface 744 connecting the second edges of the light entering surface 741 and the light facing surface 742. The light guide plate 74 has a wedge shape such that the light entering surface 741 is larger than the light facing surface 742. The light emitting surface 743 meets the light entering surface 741 and the light facing surface 742 at substantially 90-degree angles. The plane of the bottom surface 744 is inclined relative to the plane of the light emitting surface 743.

The light source unit 76 is disposed close to the light entering surface 741 of the light guide plate 74 and provides light to the light entering surface 741. The light source unit 76 includes a plurality of light emitting diodes 761 that emit light and a light source printed circuit board 762 that is mounted with the plurality of light emitting diodes 761.

The plurality of light emitting diodes 761 emits light of at least three colors, e.g., three primary colors. Usually, the three primary colors include red, green, and blue. Each light emitting diode 761 emits light having one of red, green and blue colors, and the light emitting diodes 761 may be driven at a same time or consecutively.

The different-colored lights from the plurality of light emitting diodes 761 are mixed within the light guide plate 74 to produce a substantially white light. Namely, the light guide plate 74 receives the light of various colors from the light entering surface 741 but the light that exits the light emitting surface 743 is substantially white.

The color sensor 90 is disposed at a peripheral part of the bottom surface 744 adjacent to the light facing surface 742 of the light guide plate 74. If more than one color sensor 90 are disposed, they may be disposed at a regular interval along the peripheral part the bottom surface 744. If a single color sensor 90 is used, the color sensor 90 may be disposed at a center area or a corner area of the peripheral part of the bottom surface 744. The color sensor 90 may be disposed at a place where the color sensor 90 can be easily supported in and conveniently connected with the inverter circuit board 77.

The color sensor 90 includes a sensor substrate 91 and a detecting part 92 formed on the sensor substrate 91. However, the present invention is not limited to this particular configuration. For example, the color sensor 90 may include only the detecting part 92.

The color sensor 90 detects whether the different-colored lights from the plurality of light emitting diodes 761 are properly mixed to generate white light. A detecting signal generated by the color sensor 90 is electrically transmitted to the inverter circuit board 77.

The inverter circuit board 77 is installed at a rear surface of the holding member 75.

The inverter circuit board 77 transforms external power into a voltage of regular level and transmits the transformed external power to the inverter circuit board 77. If the light detected by the color sensor 90 is not of the desired whiteness level, the inverter circuit board 77 adjusts the amount of light and/or a lighting speed of each light emitting diode 761 by controlling the light source unit 76. Accordingly, the inverter circuit board 77 uses the detection signal from the color sensor 90 to adjust the light from the light source unit 76 to ensure that they produce a substantially white light after being mixed in the light guide plate 74.

The inverter circuit board 77 is electrically connected with the light source unit 76 and the color sensor 90 through a cable (not shown) or a wire (not shown). Here, the inverter circuit board 77 is disposed closer to the color sensor 90 than the light source unit 76, and the inverter circuit board 77 is disposed on a rear surface of the holding member 75 close to the color sensor 90. With this configuration, the length of a signal wire between the inverter circuit board 77 and the color sensor 90 is shorter than the length of the signal wire between the inverter circuit board 77 and the light source unit 76. This way, the length of the cable or the wire electrically connecting the inverter circuit board 77 and the color sensor 90 may be minimized.

By disposing the inverter circuit board 77 and the color sensor 90 as close as possible as mentioned above, any negative effect of noise on the detection signal while it is traveling from the color sensor 90 to the inverter circuit board 77 is minimized.

The light amplifying member 95 is disposed between the light guide plate 74 and the color sensor 90. The light amplifying member 95 includes a convex lens. The light amplifying member 95 collects and concentrates (i.e., amplifies the intensity of) the light from the light guide plate 74 on the color sensor 90.

The reflecting member 79 is disposed adjacent to the bottom surface 744 of the light guide plate 74. The reflecting member 79 reflects the light that is incident on the light entering surface 741 and propagates to the bottom surface 744 so that it travels toward the light emitting surface 743. The reflecting light member 79 enhances the uniformity of light from the light emitting surface 743 of the light guide plate 74 by reducing light loss and diffusing the light.

The optical sheet 72 further enhances the brightness characteristic of the light from the light emitting surface 743 of the light guide plate 74. That is, the light becomes more uniformly spread and its brightness is intensified after it passes through the optical sheet 72. The optical sheet 72 may include various sheets such as a diffusion sheet, a prism sheet, a brightness enhancement sheet, etc.

The holding member 75 holds the light guide plate 74, the light source unit 76, the color sensor 90, the light amplifying member 95, the reflecting member 79 and the optical sheet 72. The supporting member 71 is coupled to the holding member 75 and supports or fixes the light guide plate 74, the light source unit 76, the color sensor 90, the light amplifying member 95, the reflecting member 79, the optical sheet 72, etc.

Referring to FIG. 2, a characteristic structure according to the first exemplary embodiment of the present invention is explained in detail.

As shown in FIG. 2, the color sensor 90 and the peripheral part of the bottom surface 744 adjacent to the light facing surface 742 face each other. The light amplifying member 95 is disposed between the light guide plate 74 and the color sensor 90. The thickness of the light entering surface 741 of the light guide plate 74 is equal to or larger than the combined thickness of the light facing surface 742, the light amplifying member 95 and the color sensor 90.

With the light guide plate 74 being wedge-shaped, the overall thickness of the backlight assembly 70 is not increased even though the light amplifying member 95 and the color sensor 90 are used.

If the thickness of the light entering surface 741 of the light guide plate 74 were less than the combined thickness of the light facing surface 742, the light amplifying member 95 and the color sensor 90, the overall thickness of the backlight assembly 70 would be undesirably increased.

The amplifying member 95 collects the light from the light guide plate 74 and concentrates it onto the color sensor 90. Accordingly, the area on the light guide plate 74 through which the light that reaches the color sensor 90 is emitted is larger than the area on the color sensor 90 that receives the same amount of light from the light guide plate 74. The light amplifying member 95 may amplify the intensity of the light by at least 10 times.

Without the light amplifying member 95, the color sensor 90 would be implemented with a larger and thicker sensor of higher detection sensitivity since the light it receives would not be as concentrated. Consequently, the combined thickness of the light facing surface 742 of the light guide plate 74 and the color sensor 90 may become greater than the thickness of the light entering surface 741 of the light guide plate 74, which is undesirable.

The supporting member 71 includes a lens accommodating part 711 that accommodates and supports the light amplifying member 95. The supporting member 71 further includes a main supporting part 715 supporting the light guide plate 74, the optical sheet 72 and the reflecting member 79, and a sensor supporting part 712 supporting the color sensor 90. The supporting member 71 further comprises a panel supporting part 716 that supports the edge portions of a panel assembly 50 (shown in FIG. 3).

By the structure described above, the light propagating from the light guide plate 74 to the color sensor 90 may be effectively amplified, and accordingly, the backlight assembly 70 can yield accurate results even with a relatively small and thin color sensor 90. This is true even if the small and thin color sensor 90 requires a relatively large amount of the light, due to the presence of the light amplifying member 95. This way, the slimness of the backlight assembly 70 is not compromised.

Figure 3:
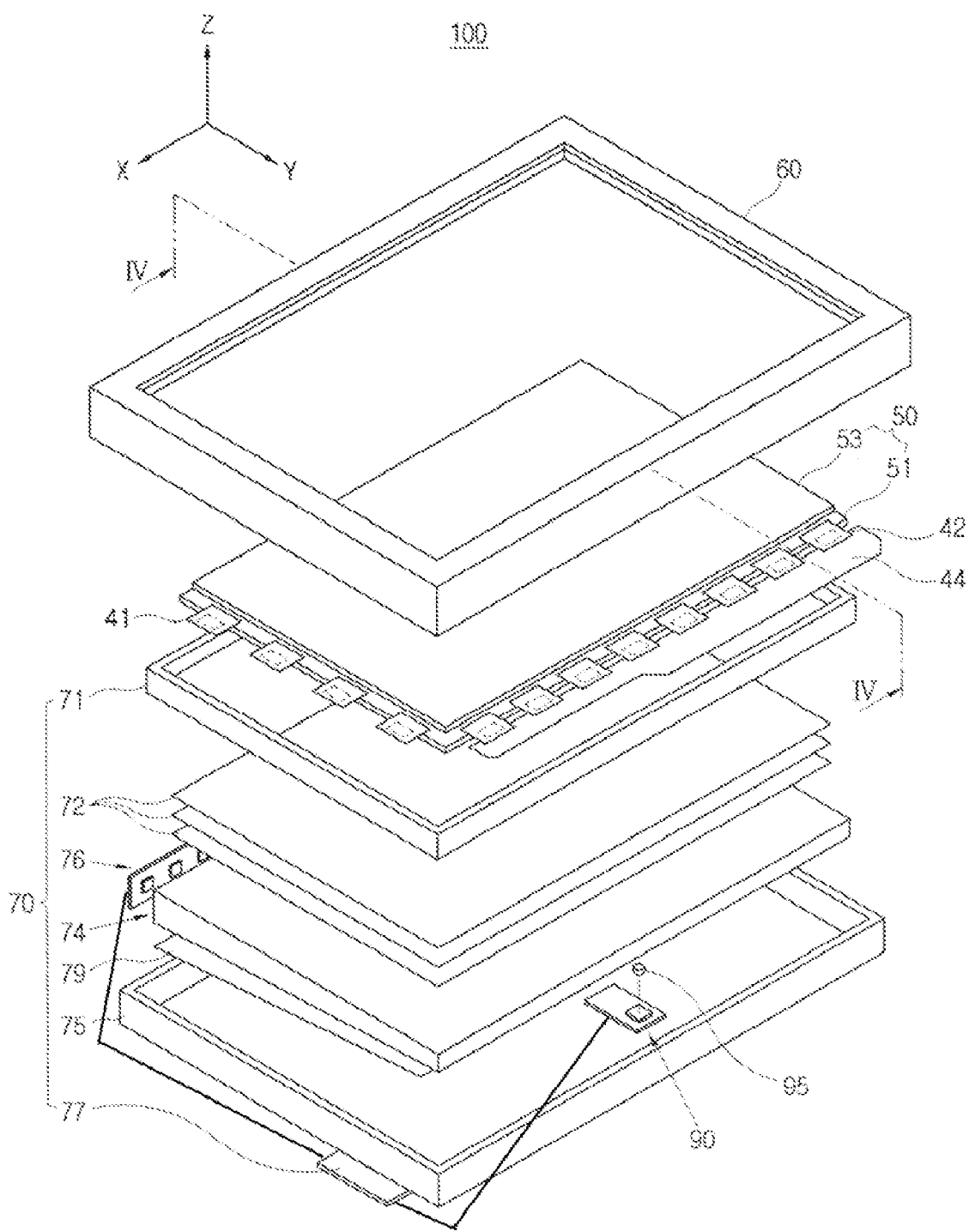
FIG. 3 is a perspective view of a disassembled display device equipped with the backlight assembly of FIG. 1.
Figure 4:
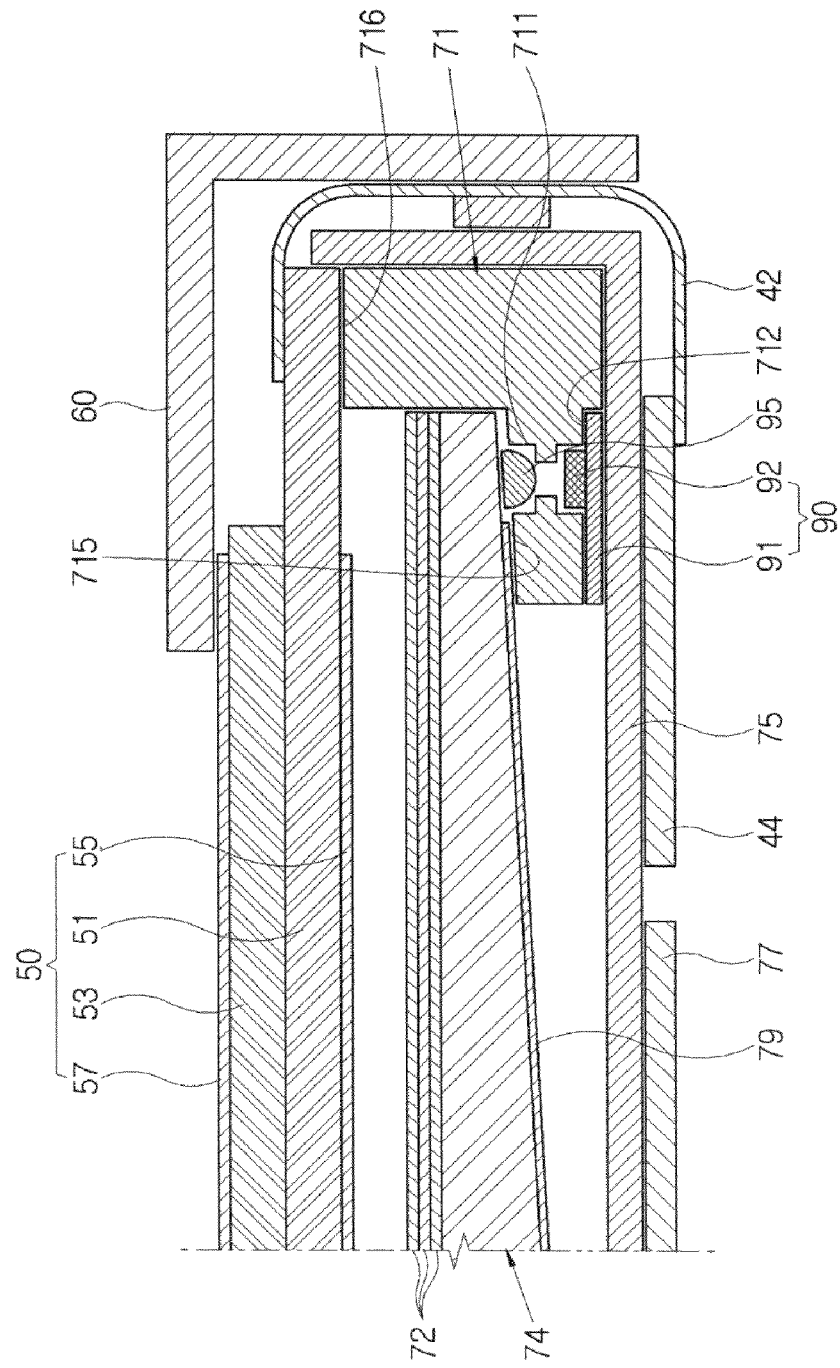
FIG. 4 is a partial cross sectional view taken along the line IV-IV of FIG. 3.

FIG. 3 and FIG. 4 represent a display device 100 equipped with the backlight assembly 70 of FIG. 1.

Although FIG. 3 and FIG. 4 illustrate an embodiment of the invention that uses a liquid crystal display panel for the panel assembly 50 of the display device 100, this is not a limitation of the invention and other suitable light-receiving display panels may be used.

The display device 100 mainly includes the backlight assembly 70 that provides light and a panel assembly 50 that displays an image using the light from the backlight assembly 70. It is understood that the display device 100 may further include a cover member 60 to support the panel assembly 50 on the backlight assembly 70 and other components that are not explicitly illustrated herein.

The display device 100 includes a plurality of integrated driving circuit chip packages 41 and 42, and a driving printed circuit board 44 that are electrically connected with the panel assembly 50 and transmit a driving signal. Here, the integrated circuit chip packages 41 and 42 are formed by chip on film package (COF) type or tape carrier package (TCP) type.

The integrated driving circuit chip packages 41 and 42 include an integrated gate driving circuit chip package 41 and an integrated data driving circuit chip package 42. The integrated gate driving circuit chip package 41 is attached at a first peripheral part of the panel assembly 50 and provides a gate signal to the panel assembly 50. The integrated data driving circuit chip package 42 is attached at a second peripheral part of the panel assembly 50 adjacent to the first peripheral part and provides other signals (including a data signal) to the panel assembly 50.

The panel assembly 50 includes a first display panel 51, a second display panel 53, and a liquid crystal layer (not shown) therebetween. Here, the first display panel 51 becomes a rear substrate and the second display panel 53, which is smaller than the first display panel 51, becomes a front substrate. The integrated driving circuit chip packages 41 and 42 are attached at the peripheral parts of the first display panel 51 that do not overlap the second display panel 53, and are connected with the panel assembly 50. At least one of the integrated driving circuit chip packages 41 and 42 is connected with a driving printed circuit board 44.

Although only the integrated data driving circuit chip package 42 is connected with the driving printed circuit board 44 in FIG. 1, the present invention is not limited to this configuration. For example, the integrated gate driving circuit chip package 42 may be connected with another printed circuit board in some embodiments.

The driving printed circuit board 44 generates various kinds of control signals and transmits a digital signal inputted from an outside to the integrated data driving circuit chip package 42. An integrated circuit chip of the integrated data driving circuit chip 42 drives the panel assembly 50 by converting the digital signal into an analog signal and supplying the analogue signal to the panel assembly 50 based on the various kinds of control signals transmitted from the driving printed circuit board 44.

In some embodiments, the display device 100 may not use a separate inverter circuit board and the driving printed circuit board 44 may perform a role of the inverter circuit board.

Polarizing sheets 55 and 57 (shown in FIG. 4) are attached on the front surface of the second display panel 53 and on the rear surface of the first display panel 51 respectively, and linearly polarizes the visible light provided from the backlight assembly 70.

A plurality of thin film transistors (TFTs), a color filter, a pixel electrode and a common electrode are formed on the first display panel 51 or the second display panel 53. A liquid crystal layer is disposed between the pixel electrode and the common electrode.

By the structure described above, an electric field is formed between the pixel electrode and the common electrode when the thin film transistor is turned on. The orientation of liquid crystals in the liquid crystal layer changes according to the electric field. Thus, a desired image can be obtained by controlling light transmittance through liquid crystal orientation.

of the slim structure of the display device 100 may be maintained.

Figure 5:
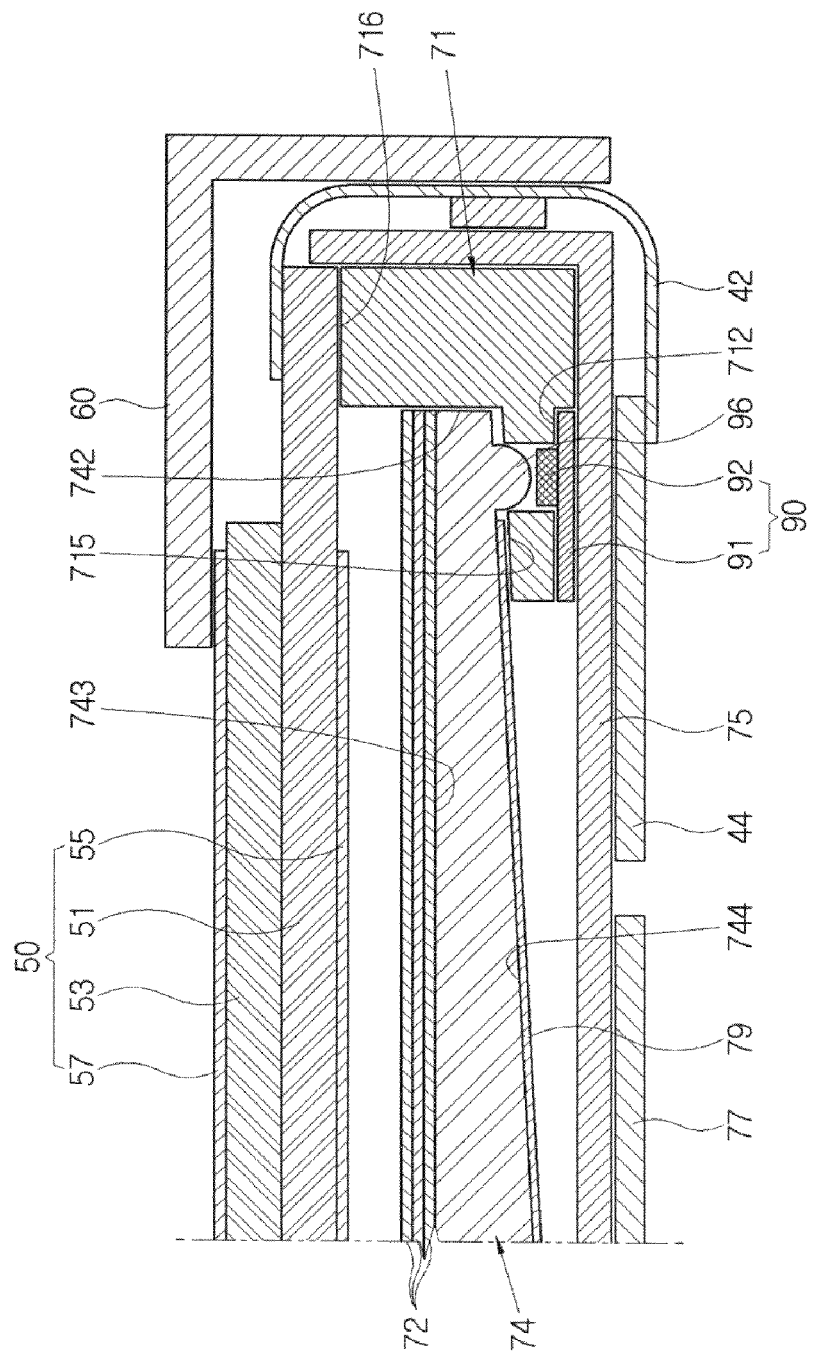
FIG. 5 is a partial cross sectional view of a display device according to a second exemplary embodiment of the present invention.

A second exemplary embodiment of the present invention is explained referring to FIG. 5.

As shown in FIG. 5, a light amplifying member 96 is formed with a light guide plate 74 in one body. In other words, the light amplifying member 96 is protruded from a periphery part of a bottom surface 744 adjacent to a light facing surface 742 to a color sensor 90, especially to a detecting part 92. The amplifying member 96 and the light guide plate 74 are formed with a same material, and include a convex lens form. Accordingly, a separate supporting means to support the light amplifying member 96 may be omitted.

With the above structure, the light that travels toward the color sensor 90 from the light guide plate 74 may be effectively amplified, allowing the display device 100 to perform accurately with a relatively small and slim color sensor 90. With the light amplifying member 96, the display device 100 may use the color sensor 90 of a relatively small and slim size even if it requires a relatively large amount of light for accurate detection. Thus, the slim appearance of the display device 100 may be maintained.

Since the light amplifying member 96 and the light guide plate 74 are formed in one body, a separate element to support the light amplifying member 96 may be omitted. This elimination of an extra element further simplifies the overall structure of the display device 100.

Hereinafter, advantages of the present invention are explained in detail through experimental results. The experimental results presented herein are illustrative and not intended to indicate any limitation to the present invention.

Experimental Result for an Exemplary Embodiment

Figure 6:
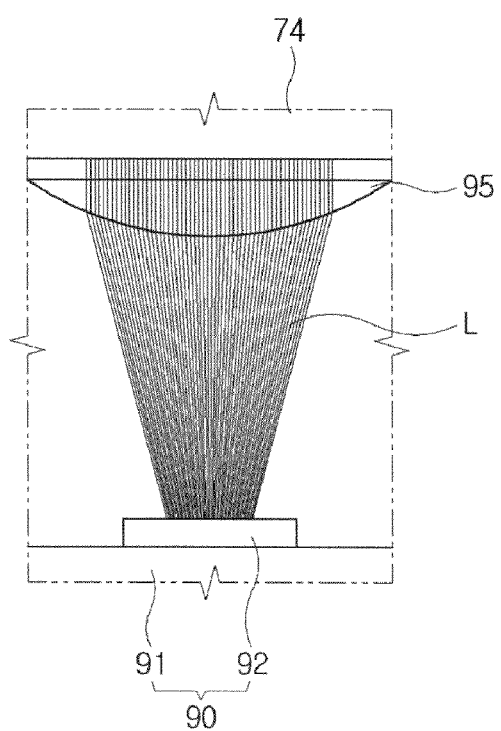
FIGS. 6 to 9 are figures illustrating experiments on an exemplary embodiment of the present invention and a comparative example.
Figure 7:
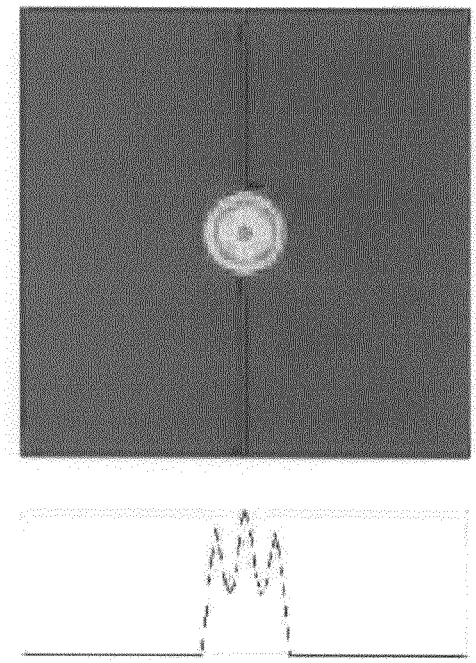

FIG. 6 illustrates the light rays in an exemplary embodiment of the present invention. FIG. 7 illustrates the distribution of light on the color sensor 90 and its brightness.

As shown in FIG. 6, the light directed to the color sensor 90 from the light guide plate 74 is amplified by being concentrated in a smaller area. The reference letter 'L' indicates a path of the light.

The distribution of light detected in the color sensor 90 and its brightness is shown in FIG. 7. The light coming from the light guide plate 74 that passes through the light amplifying member 95 is distributed densely around a center region of the color sensor 90, and its luminous intensity is approximately 52 flux/mm$^2$.

Experiment Result for a Comparative Example

Figure 8:
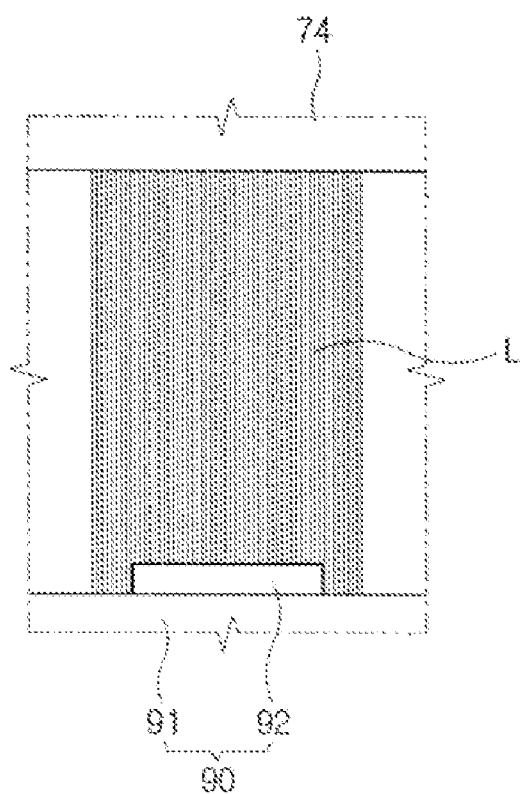
Figure 9:
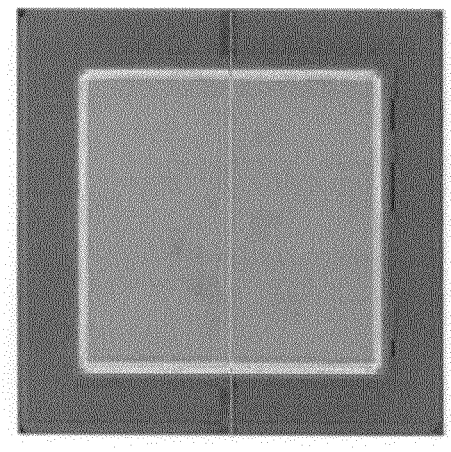
Figure 9:

FIG. 8 illustrates the light rays in a comparative example of a backlight assembly. FIG. 9 is a result of an experiment performed with the comparative example showing the distribution of light on the color sensor 90 and its brightness. The reference letter 'L' indicates a path of the light.

As shown in FIG. 8, there is no light amplifying member 74 between the light guide plate 74 and the color sensor 90 in the comparative example, and the light that exits the light guide plate 74 is directly supplied to the color sensor 90.

Distribution of light and its brightness measured in the color sensor 90 is shown in FIG. 9. The light that exits the light guide plate 74 and is directed to the color sensor 90 is distributed substantially uniformly across a whole surface of the color sensor 90 and its luminous intensity is approximately 2.2 flux/mm$^2$.

Comparing the experimental results of an embodiment according to the present invention with the comparative example, the luminous intensity detected in the color sensor 90 according to the present invention is 20 times higher in the embodiment of the invention than in the comparative example.

The experimental results indicate that the display device 100 may use the color sensor 90 of small and slim size. In other words, the backlight assembly 70 may use the small and thin color sensor 90 even if it requires a relatively large amount of the light. The overall slim appearance of the backlight assembly 70 can still be maintained.

As described above, the present invention provides a backlight assembly of slim outer appearance.

According to the present invention, the intensity of the light from a light guide plate that will be incident on a color sensor is amplified. Accordingly, a small and thin color sensor that requires a relatively large amount of light may be used. Thus, a slim structure of the backlight assembly 70 may be maintained.

Also, by forming a light amplifying member with a light guide plate in one body, the overall structure of the backlight assembly may be simplified.

Also, the present invention provides a display device equipped with the backlight assembly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
    a light guide plate having a light entering surface, a light facing surface facing the light entering surface, and a bottom surface;
    a light source unit providing light to the light entering surface of the light guide plate;
    at least one color sensor disposed to receive light from the light guide plate; and
    at least one light condensing member disposed between the light guide plate and the color sensor to collect and concentrate the light from the light guide plate on the color sensor,
    wherein a thickness of the light entering surface of the light guide plate is equal to or larger than a combined thickness of the light facing surface of the light guide plate, the light condensing member, and the color sensor.

2. The backlight assembly according to claim 1, wherein the color sensor is disposed at a peripheral part of the bottom surface of the light guide plate.

3. The backlight assembly according to claim 1, wherein an area of the color sensor that receives the emitted light is smaller than an area of the light guide plate through which the light exits the light guide plate to propagate toward the color sensor.

4. The backlight assembly according to claim 1, wherein the light guide plate has a wedge shape such that the light entering surface is larger than the light facing surface.

5. The backlight assembly according to claim 1, wherein the light condensing member comprises a convex lens and concentrates the light emitted from the light guide plate on the color sensor.

6. The backlight assembly according to claim 5, further comprising a supporting member that supports the light condensing member to be above the color sensor.

7. The backlight assembly according to claim 5, wherein
    the color sensor comprises a sensor substrate and a detecting part formed on the sensor substrate, and
    the light condensing member is disposed between the detecting part and the light guide plate.

8. The backlight assembly according to claim 5, further comprising an inverter circuit board electrically connected to the light source unit and the color sensor,
    wherein a length of a signal wire between the inverter circuit board and the color sensor is smaller than a length of a signal wire between the inverter circuit board and the light source unit.

9. The backlight assembly according to claim 8, wherein the light source unit comprises a plurality of light emitting diodes.

10. The backlight assembly according to claim 9, wherein the light emitting diodes emit at least three different colors of lights.

11. The backlight assembly according to claim 10, wherein the light guide plate receives the light emitted by the plurality of light emitting diodes, converts the light to be substantially white, and emits the light through the light emitting surface.

12. A backlight assembly comprising:
    a light guide plate having a light entering surface, a bottom surface, and at least one light condensing part;
    a light source unit providing light to the light entering surface of the light guide plate; and at least one color sensor disposed to receive light from the light guide plate, wherein the light condensing part protrudes toward the color sensor to collect and concentrate the light from the light guide plate on the color sensor, and wherein a thickness of the light entering surface of the light guide plate is equal to or larger than a combined thickness of the light facing surface of the light guide plate, the light condensing member, and the color sensor.

13. A display device comprising:

a panel assembly which displays an image;

a light guide plate having a light entering surface, a light facing surface facing the light entering surface, and a bottom surface;

a light source unit providing light to the light entering surface of the light guide plate;

at least one color sensor disposed to receive light from the light guide plate; and at least one light condensing member disposed between the light guide plate and the color sensor to collect and concentrate the light from the light guide plate on the color sensor, wherein a thickness of the light entering surface of the light guide plate is equal to or larger than a combined thickness of the light facing surface of the light guide plate, the light condensing member, and the color sensor.

14. The display device according to claim 13, wherein the color sensor is disposed at a peripheral part of the bottom surface of the light guide plate.

15. The display device according to claim 13, wherein the light guide plate has a wedge shape such that the light entering surface is larger than the light facing surface.

16. The display device according to claim 13, further comprising an inverter circuit board electrically connected with the light source unit and the color sensor, wherein a length of a signal wire between the inverter circuit board and the color sensor is smaller than a length of a signal wire between the inverter circuit board and the light source unit.

17. The display device according to claim 16, wherein the light source unit comprises a plurality of light emitting diodes which emit at least three different colors of lights; and the light guide plate receives the light from the light source unit and converts the light to be substantially white before emitting the light through the light emitting surface.

18. A display device comprising:

a panel assembly which displays an image;

a light guide plate having a light entering surface, a bottom surface, and at least one light condensing part;

a light source unit providing light to the light entering surface of the light guide plate; and at least one color sensor disposed to receive light from the light guide plate, wherein the light condensing part protrudes toward the color sensor to collect and concentrate the light from the light guide plate on the color sensor, and wherein a thickness of the light entering surface of the light guide plate is equal to or larger than a combined thickness of the light facing surface of the light guide plate, the light condensing member, and the color sensor.

* * * * *